(Model.)

J. GNADINGER, Jr.
INDICATOR FOR SPIRIT CISTERNS.

No. 266,460. Patented Oct. 24, 1882.

WITNESSES:

INVENTOR:
J. Gnadinger Jr.
BY
ATTORNEYS.

UNITED STATES PATENT OFFICE.

JOHN GNADINGER, JR., OF PARIS, KENTUCKY.

INDICATOR FOR SPIRIT-CISTERNS.

SPECIFICATION forming part of Letters Patent No. 266,460, dated October 24, 1882.

Application filed April 20, 1882. (Model.)

*To all whom it may concern:*

Be it known that I, JOHN GNADINGER, Jr., of Paris, in the county of Bourbon and State of Kentucky, have invented a new and Improved Try-Box and Indicator for Spirit-Cisterns, of which the following is a full, clear, and exact description.

This invention consists of an improved try-box or test-tube and indicator for spirit cisterns or tubs in distilleries, the object of which is to enable test-instruments to be applied to accurately show the temperature and proof of spirits contained, or the per cent. of proof by the hydrometer and thermometer, and at the same time to indicate the quantity contained in the cistern, as hereinafter more fully described, and pointed out in the claim.

Reference is to be had to the accompanying drawings, forming part of this specification, in which similar letters of reference indicate corresponding parts in all the figures.

Figures 2, 3:
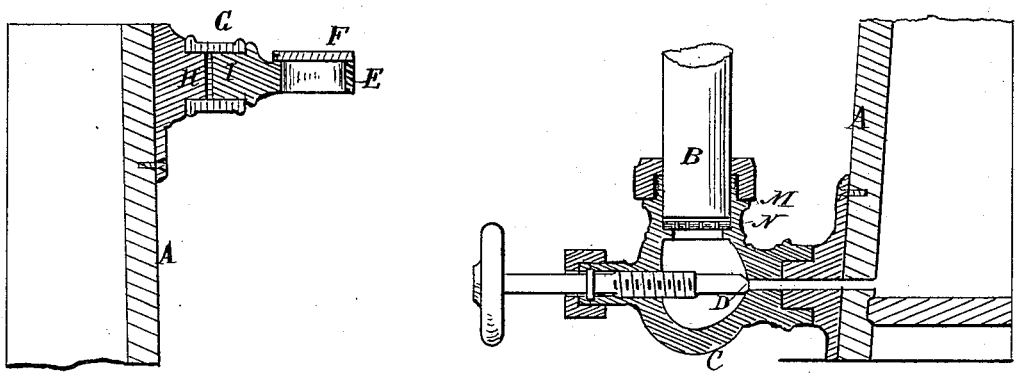
Figure 1:
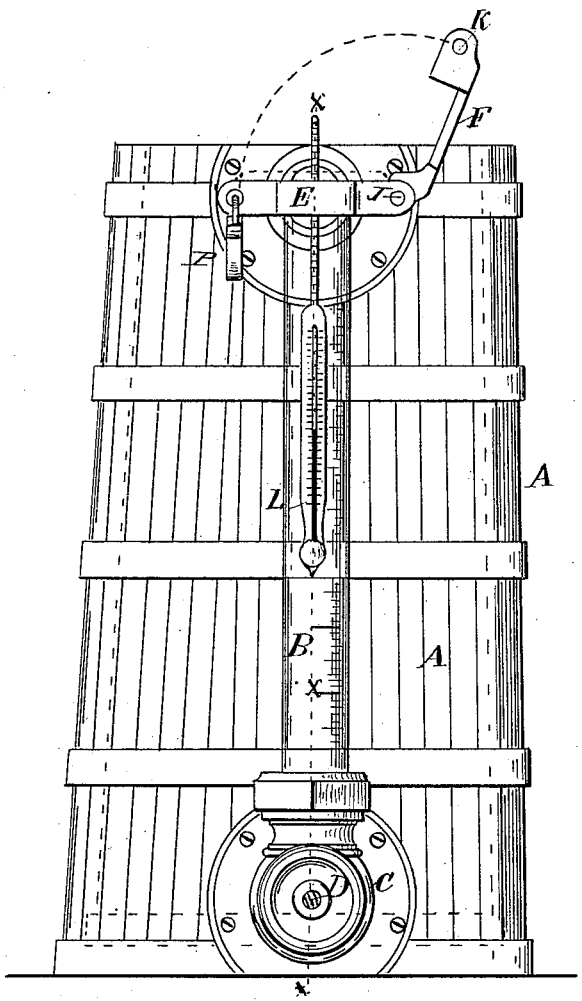

Figure 1 is a side elevation of a spirit-cistern with my improved try-box and tester applied to it. Fig. 2 is a sectional elevation of the bottom portion of Fig. 1, taken on the line $xx$; and Fig. 3 is a section of the top of Fig. 1 on the same line.

A represents the cistern, into which the spirits are delivered from the still by a pipe discharging into the top of the cistern, to which pipe the only try-box heretofore used has been applied, the said try-box being a mere glass globe or box with glass sides, and containing no instruments for ascertaining the temperature or other indication of the spirits passing through said try-box, the question of the proof of the spirits being mere guess-work with the whisky or "beer" runner, his judgment being governed by the "bead" on the liquor. Even if the try-box located on the top of the cistern should be made of suitable form for the application of the test-instruments, the hydrometer and thermometer would only show the proof of the spirits running into the cistern, and not the proof of the mass of spirits contained in the cistern. For example, if the spirits running into the cistern are one hundred and forty per cent. proof when beginning to flow, they gradually become weaker, until at last only distilled water passes over. I therefore apply a common glass gage-tube, B, to the cistern A by the gage-cock connection C, having a seat or holder, M, for the lower end of the tube, and a valve, D, adapted to admit or shut off the liquor by turning said valve, and I connect said tube at the bottom of said cistern and arrange the top of said tube in any suitable supporting-collar, E, with a cap, F, to close it when not using it, and to prevent unauthorized access to the try-box. I also connect the supporting-collar E to the top of the cistern A by an extension-joint consisting of a right-and-left coupling-nut, G, and correspondingly-threaded parts H and I; or any other equivalent means may be used instead for shifting the tube, so as to set it exactly vertical in case the cistern does not stand plumb. The cap F is connected to collar E by a pivot-joint, J, and has a hasp, K, for locking it to rim E by a lock, P. The gage-tube B is provided with a scale of linear measure to show the height of the spirit in the cistern, and thereby indicate the quantity in it.

L represents the spirit-testing hydrometer and thermometer, such as commonly used for testing spirits, said instrument being inserted in the gage-tube, as I propose to use it for testing the spirit.

N represents a perforated plate or screen at the bottom of the glass tube of the try-box to prevent the hydrometer from contact with the valve D, by which it might be broken.

The special merit of this particular arrangement of the try-box and tester is that, however much the proof of the spirit may vary as it runs from the still into the cistern, the test taken in this way will always show the mean of the whole quantity contained in the cistern at the time of making the test, and, besides, it also shows the quantity at the same time.

By the use of my instrument the exact proof as well as number of inches of spirits in the cistern can be ascertained by simply opening the valve D and allowing the spirits to flow into the glass tube and observing the indication and temperature. If the spirits are thus shown to be either too high or too low, the distiller can raise or lower to any desired proof by running sufficient low-wines or high-wines into the cistern, as the case may require.

Having thus fully described my invention, I claim as new and desire to secure by Letters Patent—

The combination, with the cistern A, the tube B, and the cock C, having seat M and screen N, of the collar E, the right and left screw-threaded parts H I, and the right-and-left coupling-nut G, substantially as and for the purpose set forth.

JOHN GNADINGER, Jr.

Witnesses:
W. T. BROOKS,
WM. KENNEY.